Feb. 23, 1960 J. M. CAZIER ET AL 2,926,051
RESILIENT BEARING MOUNT
Filed Oct. 1, 1957
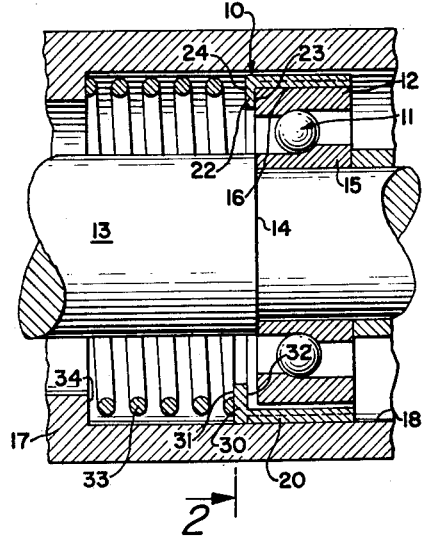
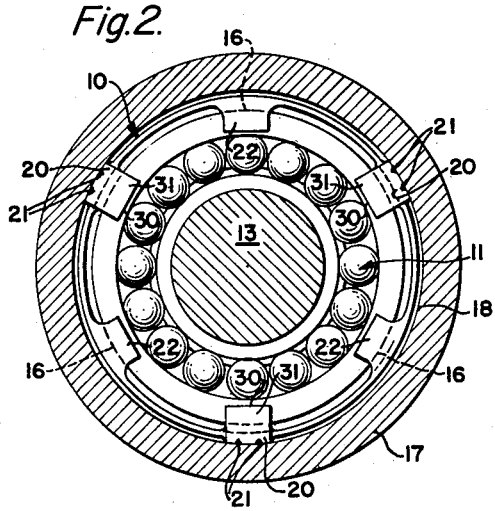
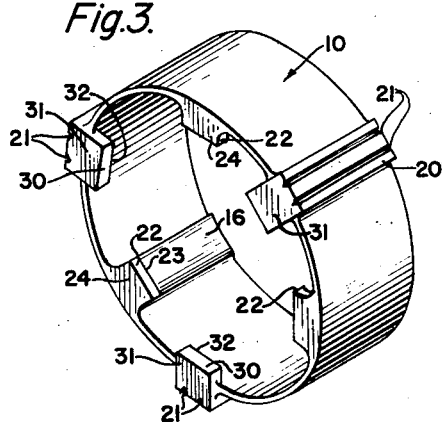
INVENTORS:
JOHN M. CAZIER,
HAROLD J. TUCHYNER.
BY
*Theodore E. Bieber*
Attorney.

United States Patent Office 2,926,051
Patented Feb. 23, 1960

2,926,051

RESILIENT BEARING MOUNT

John M. Cazier, Playa Del Rey, and Harold J. Tuchyner, Los Angeles, Calif., assignors to The Garrett Corporation, Los Angeles, Calif., a corporation of California Application October 1, 1957, Serial No. 687,427

5 Claims. (Cl. 308—184)

This invention pertains to resilient bearing mounts and more particularly to a resilient bearing mount which is capable of absorbing end thrust.

In previous resilient bearing mounts no provision was made for absorbing end thrust. Previous resilient bearing mounts also had the disadvantage that they tended to corrode or wear away at the outer surface of the resilient mount as the mount moved relative to the bore in which it was located. This corrosion or wearing away was a fret type which increased the clearance between the resilient mount and the bore, thus increasing the permissible radial movement of the shaft, which in turn increased the inertia loading on the bearings.

This invention solves the above problems by providing a resilient bearing mount utilizing a resilient sleeve whose inner diameter is slightly larger than the outer diameter of the bearing. The sleeve is provided with a plurality of pads which project radially from its inner surface, and an additional plurality of pads which project radially from its outer surface. The pads on the outer surface are staggered circumferentially between the pads which project from the inner surface. The distance between the pads on the inner surface and the distance between the pads on the outer surface is designed so that the bearing may be installed in the retainer without excessive force and the retainer installed in the bearing bore without excessive force. At high rotational speeds and high temperature any slight distortion of the bearing reduces its operational life, and thus it is preferable for the mating surface to have a slight clearance to avoid such use of excessive force. This slight clearance also permits the resilient mount to move axially in those cases where a spring type of preload is used to absorb axial thrust.

The resilient mount is provided with small tabs which project radially inwardly from each of the pads. The tabs which project from the pads on the inner surface are aligned in a plane which is substantially perpendicular to the axis of the bearing and disposed so as to contact one end of the bearing. The remaining tabs are also aligned in a plane substantially perpendicular to the axis of the sleeve but axially spaced from the plane of the first tabs. The last-mentioned tabs are so disposed to contact a shoulder formed in the bore, for the purpose of transmitting the end thrust from the resilient sleeve to the casing or housing in which the bearing is mounted.

In order to prevent a fret type of corrosion from taking place, between the pads on the outer surface of the sleeve and the bore in which the resilient mount is disposed, axial grooves are provided in the pads. These axial grooves permit lubricant, which is supplied to the bearing, to flow between the outer surface of the pads and the surface of the bore. As long as an oil film separates these two surfaces and oxidation of the surfaces is prevented, no corrosion will take place on these surfaces.

Accordingly, it is the principal object of this invention to provide a resilient bearing mount with a novel means for transmitting end thrust from the bearing to the housing in which the resilient mount is disposed.

Another object of this invention is to provide a resilient bearing mount which substantially eliminates fret type corrosion between the outer surface of the bearing mount and the inner surface of the bore in which it is disposed.

These and other objects and advantages of this invention will be more easily understood from the following detailed description of a preferred embodiment, in which:

Fig. 1 is a partial longitudinal cross-section of a resilient bearing mount constructed according to this invention;

Fig. 2 is a vertical section taken along line 2—2 of Fig. 1 and showing the tabs which project radially inward from one end of the resilient sleeve; and Fig. 3 is an isometric view of the resilient bearing mount shown in Figs. 1 and 2.

Referring to the drawing, there is shown a resilient sleeve 10 whose inner diameter is slightly larger than the outside diameter of the outer race 12 of the ball bearing 11. The ball bearing 11 is mounted on a shaft 13 so that one end of its inner race 15 bears against a shoulder 14 formed on the shaft as shown or by any desired means. The resilient sleeve 10 is provided with three inwardly projecting pads 16 which are circumferentially spaced around the inner surface of the resilient sleeve. The radial distance between the inner surface of pads 16 and the axis of the sleeve 10 is controlled so that pads 16 in co-operation with the pads 20 will exert the required grip on the outer surface of the bearing, without distorting the bearing, as described below.

The resilient bearing mount is disposed in a bore 18 formed in a casing 17. The outer diameter of the resilient sleeve 10 should be slightly smaller than the diameter of the bore 18. Three paids 20 which are circumferentially staggered between the pads 16 project outwardly from the outer surface of the sleeve 10. The radial distance between the outer surface of the pads 20 and the axis of the sleeve should be controlled so that the pads 20 in combination with the pads 16 exert a sufficient grip on the outer surface of the bearing 11 and the inner surface of the bore. In cases of very high rotational speeds, it is desirable to provide a slight clearance between the pads 16 and 20 and the bearing and bore respectively. This clearance should be on the order of a few ten thousandths of an inch. This small amount of clearance is necessary in order to provide radial clearance which is taken up when the bearing operates at high speeds or temperatures, as well as to allow the bearings to move axially. Of course, the grip or holding ability of the pads 16 and 20 will be limited by the resiliency of the portion of the sleeve between the pads, regardless of the amount of the interference fit provided. Any greater interference in the fit between the pads 16 and the outer race 12 and the pads 20 and the bore 18 will merely result in a greater deformation of the sleeve 10 and no increase in the holding ability of the pads except the small amount due to increased friction.

In order to prevent a fret type of corrosion from taking place between the mating surfaces of the resilient mount and the bore 18, two longitudinal grooves 21 are formed in the outer surface of each of the pads 20. These longitudinal grooves permit lubricant, which is supplied to the bearing 11, to flow between the mating surfaces of the pads 20 and the bore 18.

From the above description, it can be easily seen that this invention provides a resilient bearing mount which permits the spin axis of the rotating shaft to displace, so that it can approach or coincide with the principal polar axis of inertia of the rotating assembly. In order to provide sufficient resiliency in the bearing mount, it is necessary to form the resilient sleeve 10 of high strength metals, such as spring steel or the like. All of these materials are relatively hard and, thus, as the bearing mount springs in and out and tends to rotate in the bore 18, the pads 20 would tend to wear away or corrode the surfaces of the bore 18. In order to prevent this fret type corrosion or wearing away, this invention utilizes the grooves 21 to transmit lubricant to the mating surfaces. As long as an oil film is maintained between these mating surfaces, corrosion or wearing away will be substantially eliminated.

It is desirable in most bearing mounts, of course, to allow the outer race of the ball bearing to rotate slightly as the bearing is rotating in order to prevent all of the wear from occurring at one particular location in the outer race. This rotation of the outer race of the bearing will tend to cause the resilient bearing mount to also rotate, which would cause additional wearing away or fret type corrosion between the mating surfaces of the resilient mount and the bore 18 if it were not for the provisions of the grooves 21 described above.

In order to transmit end thrust from the bearing 11 to the casing 17, the resilient bearing mount is provided with three inwardly projecting radial tabs 22. Each of the tabs 22 project from one end of the sleeve 10 and are aligned with one of the pads 16. The right-hand radial surface 23 of each of the tabs 22 lies in a plane which is substantially perpendicular to the axis of the shaft 13. This permits the left-hand end of the outer race 12 to abut against the surface 23 of each of the tabs 22. The other radial surfaces 24 of each of the tabs also lies in a radial plane which is substantially perpendicular to the axis of the shaft 13. Three additional tabs 30 project radially inwardly from the same end of the resilient sleeve 10 as the tabs 22, with each of the tabs 30 being aligned with one of the pads 20, as seen in Fig. 3. The right-hand surface 32 of each of the tabs 30 lies in a radial plane which is substantially perpendicular to the axis of the shaft 13. In addition to being perpendicular to the axis of the shaft, this radial plane is axially spaced from the radial plane in which the surfaces 23 of the tabs 22 lie. The other radial surface 31 of each of the tabs 30 also lies in a radial plane which is perpendicular to the axis of the shaft 13 and spaced from the radial surface 24 of the tabs 22.

A compression spring 33 is disposed in the bore 18 so that one end reacts against a shoulder 34 formed on the bore 18, while the other end reacts against the surface 31 of each of the tabs 30. The spring 33 places an axial preload on the bearing 11 so that any end thrust from the shaft 13 will be transmitted from the bearing to the resilient bearing mount and then to the spring 33 which, in turn, will transmit the thrust to the casing 17. While a spring is shown in the attached drawing, in some applications, it may be desirable to permit the surface 31 of the tabs 30 to abut against the shoulder 34.

The use of the three tabs 22 engaging the outer race of the bearing 11 permits the thrust to be transmitted from the bearing to the resilient bearing mount. Since these tabs are aligned with the pads 16, no relative radial movement will occur between the end of the outer race 12 and the surface 23 of the tabs 22. Thus, any fret type corrosion or wearing away between these surfaces will be prevented. The use of the three tabs 30 which are aligned with the pads 20 permits the thrust to be transmitted from the resilient bearing mount to the casing 17 without any relative radial movement between the surface 31 and the casing 17. This, again, will prevent corrosion or wearing away of the surface 31. Since the three tabs 30 are axially spaced from the three tabs 22, the centerline of the shaft 13 may still shift as described above without the end of the bearing 12 contacting the surface 32 of the tabs 30. The use of the tabs does not in any way reduce the resiliency of the bearing mount nor otherwise reduce the performance of the bearing mount.

If, instead of the tabs 22 and 30, a continuous radial flange had been formed on one end of the resilient sleeve 10 to absorb the end thrust, it would greatly reduce, if not completely eliminate, the resiliency of the sleeve 10. Such a continuous radial flange would also require that the end of the outer race 12 move relative to one surface of the radial flange when the axis of rotation shifted, and this relative movement would wear away or corrode the surfaces. The same relative movement would also take place between the other surface of the radial flange and the shoulder 34 on the casing 17 or the end of the spring 33. Thus, the mere use of a radial flange or shoulder on one end of the resilient sleeve 10 for transmitting end thrust from the bearing 11 to the casing 17 is not possible.

While but one preferred embodiment of this invention has been described in detail, many modifications and improvements will occur to those skilled in the art within its broad spirit and scope.

We claim:

1. A resilient bearing mount comprising: a resilient sleeve; a first plurality of spaced pads projecting radially from the inner surface of said sleeve; a second plurality of spaced pads projecting from the outer surface of said sleeve, said second pads being staggered circumferentially between said first pads; a first plurality of tabs projecting radially inwardly from one end of said sleeve, said first tabs being circumferentially aligned with one of said plurality of spaced pads; and a second plurality of tabs projecting radially from said one end of said sleeve, said second tabs being axially spaced from said first tabs and in addition being circumferentially aligned with the other of said plurality of spaced pads.

2. A resilient bearing mount comprising: a resilient sleeve; a first plurality of spaced pads projecting radially from the inner surface of said sleeve; a second plurality of spaced pads projecting from the outer surface of said sleeve, said second pads being staggered circumferentially between said first pads; a first plurality of tabs projecting radially inwardly from one end of said sleeve, said first tabs being circumferentially aligned with said first pads; and a second set of tabs projecting radially from said one end of said sleeve, said second set of tabs being axially spaced from said first tabs and in addition being circumferentially aligned with said second pads.

3. A resilient bearing mount comprising: a resilient sleeve; a first plurality of spaced pads projecting radially from the inner surface of said sleeve; a second plurality of spaced pads projecting radially from the outer surface of said sleeve, said second pads being staggered circumferentially between said first pads; at least one axial groove formed in the outer surface of each of said second pads; a first plurality of tabs projecting radially inwardly from one end of said sleeve, said first tabs being circumferentially aligned with said first pads; and a second set of tabs projecting radially inwardly from said one end of said sleeve, said second set of tabs being axially spaced from the said first tabs and in addition being circumferentially aligned with said second pads.

4. A resilient bearing mount comprising: a resilient sleeve; a first plurality of spaced pads projecting radially from the inner surface of said sleeve; a second plurality of spaced pads projecting radially from the outer surface of said sleeve, said second pads being staggered circumferentially between said first pads; a first plurality of tabs projecting radially inwardly from one end of said sleeve, said first tabs being disposed in a first plane perpendicular to the axis of said sleeve and in addition being circumferentially aligned with said first pads; and a second set of tabs projecting radially inwardly from said one end of said sleeve, said second tabs being disposed in a second plane perpendicular to the axis of said sleeve, said second plane being axially spaced from said first plane and said second tabs in addition being circumferentially aligned with said second pads.

5. A resilient bearing mount comprising: a resilient sleeve; a first plurality of spaced pads fastened to one surface of said sleeve; a second plurality of spaced pads fastened to the other surface of said sleeve, said second pads being circumferentially staggered between said first pads; a first plurality of tabs projecting radially from one end of said sleeve, said first plurality of tabs being aligned with said first plurality of pads, and a second plurality of tabs projecting radially from said one end of said sleeve; said second plurality of tabs being axially spaced from said first plurality of tabs and in addition being aligned with said second plurality of pads.

References Cited in the file of this patent

UNITED STATES PATENTS

| | | |
|---|---|---|
| 1,423,950 | Leon | July 25, 1922 |
| 2,504,776 | Woodfield | Apr. 18, 1950 |
| 2,506,404 | Woodfield | May 2, 1950 |

FOREIGN PATENTS

| | | |
|---|---|---|
| 127,509 | Great Britain | June 5, 1919 |
| 65,482 | Denmark | Feb. 24, 1947 |